US009970475B2

(12) United States Patent
Chang et al.

(10) Patent No.: US 9,970,475 B2
(45) Date of Patent: May 15, 2018

(54) WALL-MOUNTABLE ASSEMBLY AND METHOD OF USE (71) Applicant: 3M INNOVATIVE PROPERTIES COMPANY, St. Paul, MN (US)

(72) Inventors: Pei Chun Chang, Taoyuan (TW); Kenneth B. Wood, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/526,074

(22) PCT Filed: Nov. 16, 2015

(86) PCT No.: PCT/US2015/060881
§ 371 (c)(1),
(2) Date: May 11, 2017

(87) PCT Pub. No.: WO2016/081366
PCT Pub. Date: May 26, 2016

(65) Prior Publication Data
US 2017/0314608 A1  Nov. 2, 2017

Related U.S. Application Data (60) Provisional application No. 62/081,698, filed on Nov. 19, 2014.

(51) Int. Cl.
| F16B 47/00 | (2006.01) |
| A47G 1/17 | (2006.01) |
| A47B 5/00 | (2006.01) |
| A47B 95/00 | (2006.01) |
| B65D 25/22 | (2006.01) |

(52) U.S. Cl.
CPC .......... *F16B 47/003* (2013.01); *A47B 95/008* (2013.01); *A47G 1/175* (2013.01); *B65D 25/22* (2013.01)

(58) Field of Classification Search
CPC .......... A47G 1/175; A47G 1/17; A47K 10/10; A47B 95/008; F16B 47/003
USPC ....................................... 248/205.4
See application file for complete search history.

(56) References Cited

U.S. PATENT DOCUMENTS

| 3,928,894 A | 12/1975 | Bury et al. |
| 4,024,312 A | 5/1977 | Korpman |
| 4,668,546 A * | 5/1987 | Hutter, III ........... B29C 65/7855 156/247 |
| 5,439,307 A * | 8/1995 | Steinhilber .......... A47B 17/033 248/220.21 |

(Continued)

FOREIGN PATENT DOCUMENTS

| CN | 1295604 A | 5/2001 |
| CN | 201542371 U | 8/2010 |

(Continued)

OTHER PUBLICATIONS

International Search Report for PCT International Application No. PCT/US2015/060881, dated Feb. 23, 2016, 3 pages.

*Primary Examiner* — Michael Safavi
(74) *Attorney, Agent, or Firm* — Kenneth B. Wood (57) ABSTRACT

An assembly that is removably mountable to a wall, the assembly including a base plate and a mounting plate that is asymmetrically deflectably coupled to the base plate.

19 Claims, 6 Drawing Sheets

(56) References Cited

U.S. PATENT DOCUMENTS

| | | | |
|---|---|---|---|
| 5,516,581 A | 5/1996 | Kreckel | |
| 5,695,165 A * | 12/1997 | Moriarty | B01L 9/54 |
| | | | 248/205.4 |
| 5,909,758 A * | 6/1999 | Kitamura | A47K 3/003 |
| | | | 16/406 |
| 6,187,404 B1 * | 2/2001 | Schumann | A47G 1/175 |
| | | | 248/205.3 |
| 6,431,508 B1 * | 8/2002 | Courson | A47G 1/17 |
| | | | 248/205.3 |
| 7,802,766 B2 * | 9/2010 | Thompson | F16B 12/22 |
| | | | 248/220.1 |
| 7,854,817 B2 | 12/2010 | Thompson | |
| 7,985,313 B2 | 7/2011 | Thompson | |
| 8,020,820 B2 | 9/2011 | Thompson | |
| 8,141,829 B2 * | 3/2012 | Hutter, III | F16B 11/006 |
| | | | 24/304 |
| 8,939,417 B1 * | 1/2015 | Wengreen | F16M 11/041 |
| | | | 248/205.3 |
| 9,284,973 B2 * | 3/2016 | Hoffman | F16B 35/04 |
| 9,339,112 B2 * | 5/2016 | Wengreen | A47B 97/00 |
| 2009/0242712 A1 * | 10/2009 | Thompson | A47G 1/175 |
| | | | 248/221.11 |
| 2011/0011994 A1 * | 1/2011 | Ahlstrom | A47G 1/168 |
| | | | 248/205.4 |
| 2012/0153102 A1 | 6/2012 | Thompson | |
| 2012/0198780 A1 | 8/2012 | Snowwhite | |
| 2014/0166829 A1 | 6/2014 | Thompson | |

FOREIGN PATENT DOCUMENTS

| | | | |
|---|---|---|---|
| CN | 202136132 U | 2/2012 | |
| CN | 202251380 | 5/2012 | |
| DE | 3331016 | 10/1984 | |
| JP | S51-071455 A | 6/1976 | |
| JP | 2000197581 | 7/2000 | |
| JP | 2000-226557 A | 8/2000 | |
| JP | 2002209714 | 7/2002 | |
| WO | WO 1995-06691 | 3/2005 | |
| WO | WO2012078085 * | 6/2012 | A47F 5/08 |

* cited by examiner

WALL-MOUNTABLE ASSEMBLY AND METHOD OF USE

BACKGROUND

Adhesives (e.g., pressure-sensitive adhesives) have often found use in mounting articles on surfaces. For example, double-faced adhesive tapes (i.e., tapes bearing adhesive on both major opposing surfaces) are widely known and used. In particular, stretch-releasing adhesive tapes have found use in a wide variety of mounting applications.

SUMMARY

In broad summary, herein is disclosed an assembly that is removably mountable to a wall, the assembly comprising a base plate and a mounting plate that is asymmetrically deflectably coupled to the base plate. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Terms such as above, below, up, upper, down, lower, top and bottom, etc., are used in relation to the specific depictions in the Figures herein, for ease of reference to the Figures, and do not imply any specific orientation with respect to Earth's gravity unless noted. As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 30 degrees. The term "substantially", unless otherwise specifically defined, means to a high degree of approximation (e.g., within +/−10% for quantifiable properties). For angular orientations, the term "substantially" means within clockwise or counterclockwise 10 degrees. The term "essentially" means within plus or minus 2% (plus or minus 2 degrees for angular orientations), and it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

DETAILED DESCRIPTION

Glossary

Terms such as outward, outwardmost, and the like, denote a direction that is away from the exterior surface (36, in various Figures) of a base plate, and is toward a wall (60, in various Figures) on which the base plate is to be mounted, the direction being at least generally along an axis that is normal to the plane of a major adhesive-receiving surface (11, in various Figures) of a mounting plate that is coupled to the base plate. Such an axis, and this direction along this axis, are respectively designated as z and $z^+$ in various Figures. Terms such as inward, inwardmost, etc., denote a direction ($z^-$) opposite the $z^+$ direction. By an "exposed" adhesive surface is meant an adhesive surface that is not covered with a release liner. Such an exposed surface may nevertheless be e.g. bonded to a wall so that little or none of the surface is visible.

Figure 1:
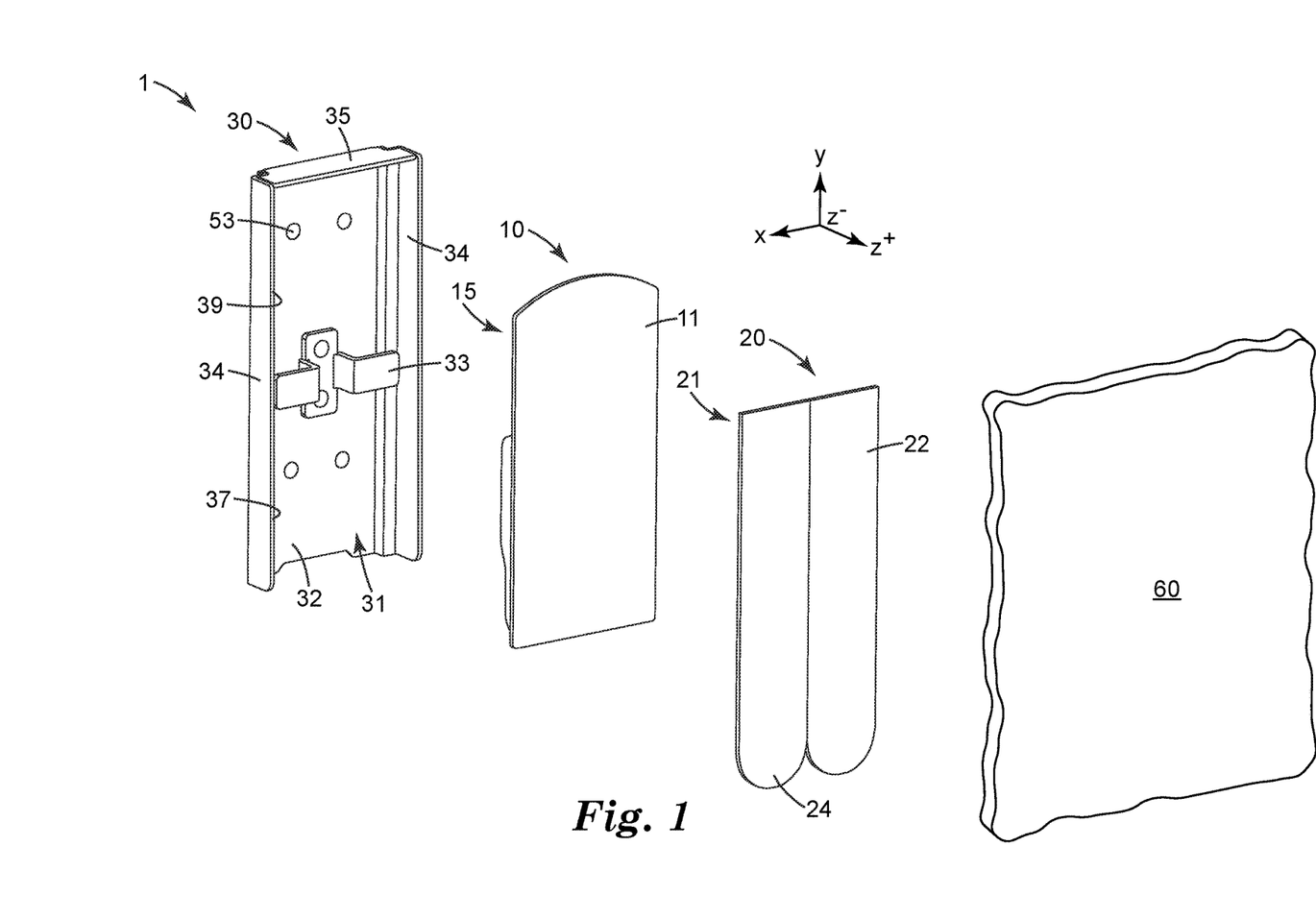
FIG. 1 is a perspective exploded view, viewed from the wall side, of an exemplary base plate, mounting plate, and double-faced adhesive as disclosed herein.
Figure 2:
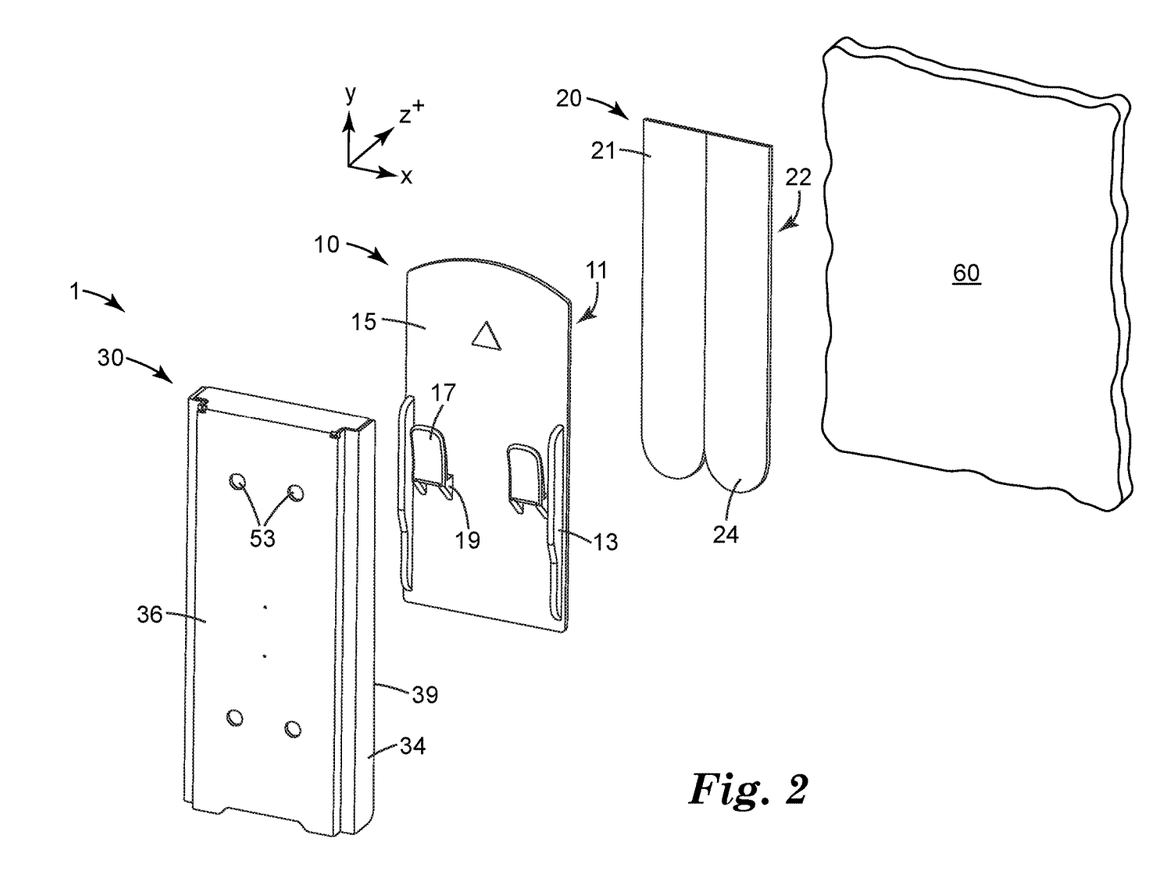
FIG. 2 is a perspective exploded view, viewed facing toward a wall, of the exemplary base plate, mounting plate, and double-faced adhesive of FIG. 1.

Herein is disclosed an assembly 1 that is removably mountable to a wall 60. With reference to FIGS. 1 and 2, assembly 1 comprises base plate 30 and mounting plate 10 that is removably and deflectably coupled to base plate 30. (The term plate is used for convenience and does not necessitate e.g. a purely planar shape or format.) By removably coupled is meant that in ordinary use of the assembly and without use of tools, mounting plate 10 and base plate 30 can be manually decoupled (separated) from each other without destroying or damaging either item. By deflectably coupled is specifically meant asymmetrically deflectably coupled, meaning that mounting plate 10 is coupled to base plate 30 in such manner that a first portion of mounting plate 10 can be manually deflected outward (e.g. by way of finger pressure) toward a wall, while a second portion of mounting plate 10 does not move outward (or may even move slightly inward) during the deflecting of the first portion, as discussed in detail later herein.

Mounting plate 10 comprises a double-faced adhesive 20 (i.e., an adhesive sheet) with a first major adhesive surface 21 that is adhesively bonded (attached) to a first major surface 11 of mounting plate 10 and with a second major adhesive surface 22 that is an exposed adhesive surface (and that will eventually be bonded to wall 60). In some embodiments, mounting plate 10 may comprise an elongated shape with a long axis and a short axis, as shown in FIGS. 1 and 2. Often, the long axis (the y axis in various Figures) may conveniently be at least generally aligned with the Earth's gravity, with the short axis (the x axis in various Figures) being a transverse (lateral) axis of mounting plate 10. Similar considerations hold for base plate 30 and adhesive 20. Mounting plate 10 comprises a second major surface 15 that faces oppositely from first major surface 11. Mounting plate 10 comprises one or more coupling structures 17 (a cantilevered beam in some exemplary embodiments, described in detail later herein) that can mate with one or more complementary coupling structures 33 of base plate 30 to form a coupling mechanism, as discussed later herein. In some embodiments such a coupling structure 17 may protrude inwardly from major surface 15 of mounting plate 10. Mounting plate 10 can be comprised of any suitable material, including polymeric materials, ceramic materials, metals, and the like. In one embodiment, mounting plate 10 is comprised of an injection molded organic polymeric material.

Double-faced adhesive 20 can comprise any suitable sheet that comprises pressure-sensitive adhesive functionality on first major surface 21 and oppositely-facing second major surface 22. A pressure-sensitive adhesive is normally tacky at room temperature and can be adhered to a surface by application of, at most, light finger pressure. In at least some embodiments, a pressure-sensitive adhesive may meet the Dahlquist criterion described in Handbook of Pressure-Sensitive Adhesive Technology, D. Satas, $2^{nd}$ ed., page 172 (1989). This criterion defines a pressure-sensitive adhesive as an adhesive having a one-second creep compliance of greater than $1\times10^{-6}$ cm$^2$/dyne at its use temperature (for example, at temperatures in a range of from 15° C. to 35° C.). Adhesive sheet 20 is configured such that first major surface 21 can be adhesively bonded to first major surface 11 of mounting plate 10, and such that second major surface 22 can be adhesively bonded to a suitable wall surface. (While the term "wall" is used for convenience herein, the term broadly encompasses any item or entity (e.g., panel, partition, window, and so on) on which it might be desired to mount assembly 1.)

Although two double-faced adhesive sheets 20 are used (in side-by-side format) in the exemplary embodiment of FIGS. 1 and 2, any suitable number may be used. In many embodiments (e.g. involving relatively light loads), a single double-faced adhesive 20 may be used. Adhesive sheet 20 may be supplied to a user already bonded to major surface 11 of mounting plate 10; or sheet 20 may be supplied separately to be bonded to major surface 11 of mounting plate 10 by the user. The double-faced adhesive can comprise any suitable adhesive that is available in the form of a sheet, tape, roll good, etc., from which a discrete adhesive sheet piece 20 can be obtained which is suitable for being contacted with and bonded to surface 11 of mounting plate 10. Suitable adhesives thus include double-stick tapes, laminating adhesives, double-faced foam tapes, and the like, as are commonly known in the art. Double-faced adhesive 20 may be conveniently supplied with a release liner on one or both major adhesive surfaces of the double-faced adhesive, which release liner may be removed from an adhesive surface so that the adhesive surface is an exposed adhesive surface as defined herein.

In a particular embodiment, the double-faced adhesive comprises a stretch-release adhesive. Such a stretch-release property can allow the adhesive to be securely attached to a surface and to be later removed from the surface without visual disfigurement of, or leaving adhesive residue on, the surface. A suitable stretch releasing adhesive tape can comprise an elastic backing, or a highly extensible and substantially inelastic backing, with a pressure-sensitive adhesive disposed (e.g. coated) thereupon. Or the tape can be formed of a solid, elastic pressure sensitive adhesive. Thus, in this context, the term "tape" encompasses products that comprise a unitary, integral, or solid construction of adhesive (in addition to products that comprise a backing with separate layers of adhesive residing thereupon). Suitable exemplary stretch releasing tapes are described in U.S. Pat. No. 4,024,312 to Korpman; German Patent No. 33 31 016; U.S. Pat. No. 5,516,581 to Kreckel et al.; and PCT International Publication No. WO 95/06691 to Bries et al. Such stretch-release adhesives can range, for example, from about 0.2 mm in thickness to about 2 mm in thickness. In particular, stretch-release adhesives are often about 1 mm in thickness.

If double-faced adhesive 20 is a stretch-release adhesive, it may comprise a pull tab 24 (e.g., an end of the sheet that does not comprise adhesive) which may be grasped by a user and pulled so as to activate the stretch-release properties of the adhesive. Adhesive sheet 20 may be positioned on surface 11 of mounting plate 10 such that pull tab 24 extends beyond (below, as shown in FIG. 1) a terminal edge of mounting plate 10 so that pull tab 24 can be grasped by a user. Occasionally, a user may (e.g., inadvertently) position adhesive sheet 20 so that a small area of exposed adhesive surface may extend past a terminal edge of mounting plate 10; such nuances will not affect the discussions later herein of an adhesive surface being "fully" bonded to a wall.

Base plate 30 is configured such that, when it is coupled to mounting plate 10 (which is itself attached to a wall 60 via double-faced adhesive sheet 20), one major surface 32 of base plate 30 faces the wall and the other major surface 36 faces away from the wall. Thus, with reference to FIGS. 1 and 3, base plate 30 comprises an exterior surface 36 that may be visible when base plate 30 is mounted to a wall (although in some instances at least a portion of exterior surface 36 may be covered by an accessory). If desired, this exterior surface 36 can be configured to be ornamental in appearance (e.g., polished, textured, glazed, painted, decorated, etc.). Base plate 30 can be comprised of any suitable material, including polymeric materials, ceramic materials, and the like. In one embodiment, base plate 30 is comprised of metal. In a specific embodiment, base plate 30 is comprised of zinc or a zinc alloy. In another specific embodiment, base plate 30 is comprised of cold rolled steel sheeting.

Figure 9:
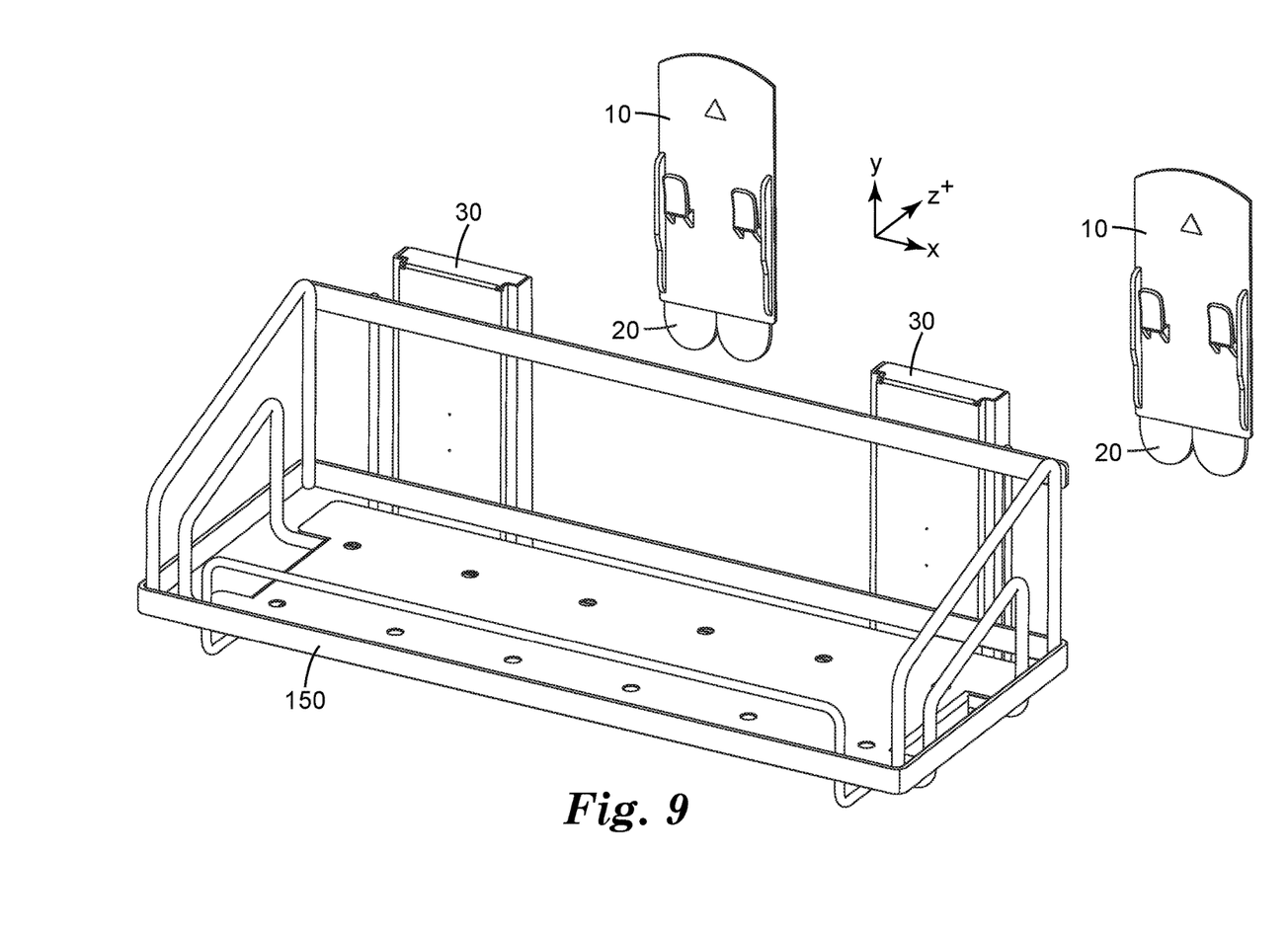
FIG. 9 is a perspective exploded view, viewed facing away from a wall, of an exemplary assembly comprising two base plates and two mounting plates.

Base plate 30 can be any suitable shape (e.g. round, square, hexagonal, etc.) In one embodiment, base plate 30 comprises an elongated shape (e.g., as shown in FIG. 1) with a long axis and a short axis. In such a case base plate 30 can be rectangular, oval, diamond-shaped, etc. Base plate 30 can be configured to receive an accessory (e.g., accessory 150 as shown in FIG. 9, as discussed later herein). Thus, in some embodiments base plate 30 comprises one or more connecting structures by which an accessory can be connected (attached) to base plate 30. In various embodiments, such a connecting structure can comprise a hole (e.g., holes 53 shown in FIGS. 1 and 2), a post, or any other suitable structure (e.g., slots, pins, clamps, etc.). In some embodiments, an accessory may be removably connected to base plate 30. In other embodiments, an accessory may be permanently connected to base plate 30 (for example, a metal accessory might be spot-welded to a metal base plate, a plastic accessory might be adhesively bonded or solvent-welded to a plastic base plate, and so on). In particular embodiments, base plate 30 and an accessory may be integral with each other (meaning that they are made of the same material and are made in the same operation, e.g. they may be injection molded as a single piece). Regardless of whether the connecting is removable or permanent, in some embodiments an accessory may be fixedly connected to base plate 30, meaning that at least substantially no movement of the two items relative to each other will occur in ordinary use of the assembly.

Base plate 30 comprises at least one coupling structure 33 (comprising e.g. one or more engaging members, described in detail later herein) that can mate with at least one complementary coupling structure 17 of mounting plate 10 to form a coupling mechanism 40, as discussed later herein. In some embodiments such a coupling structure 33 may protrude outwardly from major interior surface 32 of base plate 30.

Any desired accessory may be used with assembly 1 (e.g., may be connected to base plate 30). A single accessory may be used, or multiple accessories may be used. In general, such accessories are often used to support the weight of one or more objects (e.g., pictures, plaques, garments, bottles of liquid or powder, and so on). A non-limiting list of accessories includes shelves, baskets, elongate rods (e.g. towel racks or hangers), utility hooks (e.g. for hanging pictures or plaques), garment hooks (e.g. robe hooks), soap dishes, brush holders, bottle or jar holders, cruets, racks, speaker brackets, and the like. In some embodiments, such an accessory may, when assembly is 1 is mounted on a wall, have an elongate axis that extends in a horizontal direction with respect to the Earth (e.g., in the manner of a shelf, a towel rod, and so on), as in the exemplary embodiment of FIG. 9.

Figure 4:
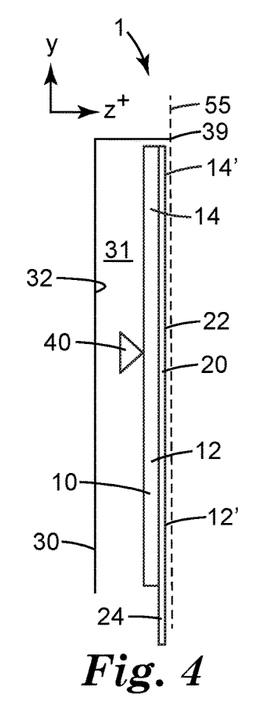
FIG. 4 is a generic, idealized side view of an exemplary base plate, mounting plate, and double-faced adhesive, with the mounting plate and adhesive in a recessed condition.
Figure 5:
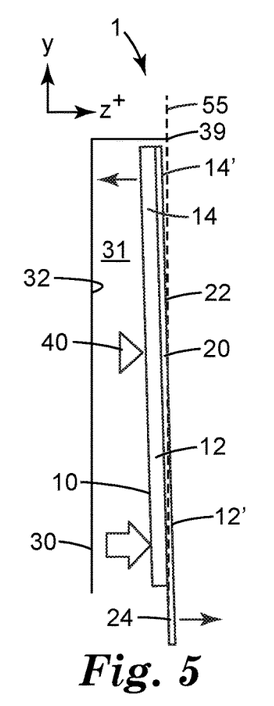
FIG. 5 is a generic, idealized side view of an exemplary base plate, mounting plate, and double-faced adhesive, with the mounting plate and adhesive in a second, asymmetrically deflected condition.

Mounting plate is 10 is coupled to base plate 30 so that mounting plate 10 is asymmetrically deflectable with respect to base plate 30. By asymmetrically deflectable is meant that a first portion of mounting plate 10 can be deflected outward while a second portion of mounting plate 10 does not move outward, or even moves inward slightly, during this process. This is depicted in FIGS. 4-5, in which, for ease of presentation, the various components of assembly 1 are shown in idealized generic representation. In FIG. 4, mounting plate 10 is in a first, recessed condition as discussed in detail later herein. A force applied (e.g. by manual finger pressure) to a first (lower) portion 12 of mounting plate 10 (e.g., at the location indicated by the large block arrow in FIG. 5), will cause lower portion 12 of mounting plate 10 to deflect slightly outward (i.e., in the direction indicated by the large block arrow in FIG. 5). However, coupling mechanism 40 (indicated generically by the triangle in FIGS. 4 and 5) that couples mounting plate 10 and base plate 30 to each other, may at least substantially prevent second portion 14 of mounting plate 10 (i.e., a portion that is above coupling mechanism 40) from deflecting during the deflecting of first portion 12. Or, coupling mechanism 40 may act as a fulcrum so that the second portion 14 of mounting plate 10 may deflect (move) slightly in a generally opposite direction from the direction in which lower portion 12 deflects. (That is, the upper portion 14 may move slightly inward, in the direction indicated by the small arrow in FIG. 5.) Either of these may occur, depending on the particular design of the coupling mechanism, and both are encompassed by the herein-disclosed concept of asymmetrical deflection. (The second of these is illustrated in the exemplary depiction of FIG. 5.)

This asymmetric deflection can have the effect of moving a first portion 12 of mounting plate 10 outward toward wall 60 so that in this first portion 12, an exposed adhesive surface 22 of double-faced adhesive 20 can be brought into contact with a wall and adhesively bonded thereto. This condition, in which a first portion of an exposed adhesive surface is bonded to a wall while a second portion of the exposed adhesive surface remains unbonded, will be referred to herein as "partially" bonded. "Partially" bonded is distinguished from "fully" bonded, in which at least substantially an entire exposed adhesive surface of an adhesive layer (e.g., the entirety of the exposed adhesive surface), is bonded to a wall.

In further detail, mounting plate 10 is asymmetrically deflectable at least from a first, undeflected condition to a second, asymmetrically deflected condition. In the first, undeflected condition (represented generically in FIG. 4) all portions of the second major adhesive surface 22 of the double-faced adhesive 20 are positioned inward of outwardmost surface portions 39 of the base plate. Specifically, all portions of second major adhesive surface 22 are positioned inward of imaginary plane 55 as discussed in detail below. In the second, asymmetrically deflected condition, a first portion 12' of the second major adhesive surface 22 of the double-faced adhesive is positioned outward from (beyond) the outwardmost surface portions 39 of the base plate; and, a second portion 14' of the second major adhesive surface remains positioned inward of the outwardmost surface portions of the base plate, as shown in generic representation in FIG. 5. In other words, a first portion 12' of adhesive surface 22 (e.g. a lower portion) protrudes outward beyond imaginary plane 55, while a second portion (e.g., an upper portion) 14' of adhesive surface 22 remains recessed inward (toward interior surface 32 of base plate 30) relative to imaginary plane 55, both as shown in generic representation in FIG. 5.

It will be appreciated that providing mounting plate 1 in a recessed condition allows assembly 1 comprising base plate 30 and mounting plate 10 bearing double-faced adhesive 20 with an exposed adhesive surface 22, to be brought against a wall 60 and positioned as desired, without the exposed adhesive surface 22 being brought into contact with the wall. This is because the outwardmost surface portions 39 of base plate 30 will contact the wall and thus preclude any contact of exposed adhesive surface 22 with the wall. Base plate 30 (and assembly 1 as a whole) can thus be slidably moved along the wall, without the exposed adhesive surface contacting the wall surface and bonding to the wall prematurely. This allows assembly 1 to be positioned and oriented on the wall as desired.

When the assembly is in the desired location and orientation on the wall, mounting plate 10 can be asymmetrically deflected as described above. In assemblies of the general type depicted in the Figures herein, this may be conveniently done e.g. by inserting a finger or small tool into the lower portion of open-ended cavity 31 and then to manually press against surface 15 of lower portion 12 of mounting plate 10 to deflect lower portion 12 outward. (The insertion of a finger or small tool into open-ended cavity 31 may be facilitated by e g minimizing or omitting any lower wall from the baseplate, as illustrated in various Figures herein.)

The asymmetrical deflection will bring a first portion 12' of the exposed adhesive surface 22 into contact with the wall thus obtaining a partial bond as described above. This partial bond will be sufficient to allow the base plate 30 to be temporarily decoupled (detached) from mounting plate 10, with mounting plate 10 remaining in place on the wall (slight finger pressure may be placed on mounting plate 10 during this process, if desired, to hold it more firmly against the wall). In embodiments that rely on the general type of coupling mechanism illustrated in FIGS. 1-3, the decoupling is achieved by sliding base plate 30 upward relative to mounting plate 10 (and subsequent reattachment is achieved by reversing this process). However, any coupling mechanism, relying on any coupling and decoupling process, may be used as desired.

Figure 6:
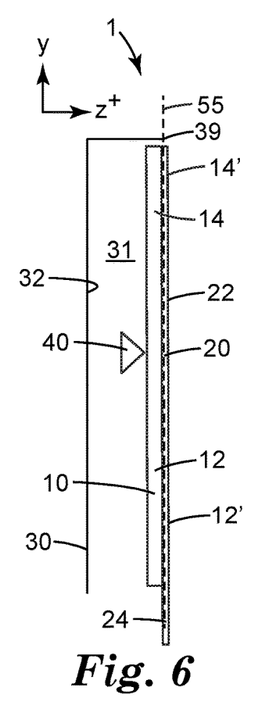
FIG. 6 is a generic, idealized side view of an exemplary base plate, mounting plate, and double-faced adhesive, in a fully bonded condition.

Often, some or all of the second portion 14' of adhesive surface 22 may become bonded to the wall, during the decoupling of base plate 30 from mounting plate 10. Whether or not this happens, after base plate 30 has been decoupled from mounting plate 10 to expose mounting plate 10, force can be applied to mounting plate 10 (e.g. by manually pressing against major surface 15 of mounting plate 10) to fully bond exposed adhesive surface 22 to the wall. After this (with a delay if desired, in order to allow the bond between the adhesive and the wall to develop fully), base plate 30 can then be recoupled to mounting plate 10. It will be appreciated that at this time, with the entirety of adhesive surface 22 fully bonded to the wall, the assembly may be in a configuration as depicted in generic representation in FIG. 6, in which the entirety of adhesive surface 22 is positioned outward beyond imaginary plane 55. (The wall has been omitted from FIGS. 4-6 for ease of presentation.)

In general, methods disclosed herein are distinguished from any method in which an exposed adhesive surface of a double-faced adhesive is fully bonded to a wall in a single operation. In particular, methods disclosed herein are distinguished from those in which a first major adhesive surface of a double-faced adhesive is bonded to a wall, the second major adhesive surface of the double-faced adhesive is exposed, and an item (e.g. a mounting plate or base plate) is then brought into contact with the exposed second major adhesive surface of the double-faced adhesive and bonded thereto. Still further, the apparatus and methods disclosed herein are distinguished from those in which an item bearing an exposed adhesive surface is brought near a wall surface but is separated therefrom by a spacer, the item is positioned and oriented as desired, and the item is then moved toward the wall so that the spacer is deformed and/or dislodged in the act of bonding the exposed adhesive surface to the wall (apparatus and methods of that general type are disclosed e.g. in U.S. Pat. Nos. 7,854,817 and 7,985,313).

Figure 3:
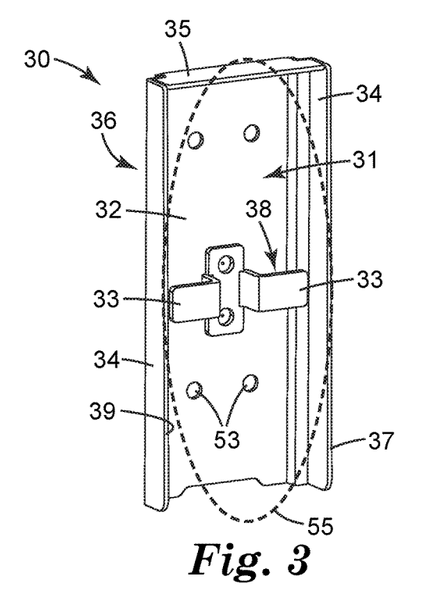
FIG. 3 is a perspective isolated view of the base plate of FIG. 1.

In still further detail, in many embodiments the outwardmost surface portions 39 of base plate 30 (i.e., the surfaces that contact wall 60 when the assembly is initially brought to the wall) may be outwardmost surfaces 39 of outwardly-extending sidewalls 34 of base plate 30, as shown in exemplary embodiment in FIGS. 1-3. Outwardmost portions 39 of sidewalls 34 (and e.g. of upper wall 35 if one is present and if it protrudes outward to the same distance as the outwardmost surfaces of sidewalls 34) may thus define a partial perimeter 37 (noting that it may be convenient to omit any "lower" wall in order to allow mounting plate 10 to be easily slidably moved into place on base plate 30 to couple the plates together and to allow the insertion of e.g. a finger to perform the asymmetric deflection, as discussed above). An imaginary plane 55 can be defined by outwardmost surfaces 39 of sidewalls 34 (i.e., defined by partial perimeter 37) as shown in FIG. 3. Even if sidewalls 34 are interrupted or otherwise discontinuous, and/or have a convoluted or textured surface, such an imaginary plane 55 can still be defined by the outwardmost portions of sidewalls 34. Thus, imaginary plane 55 can still be defined even if partial perimeter 37 is defined e.g. by a series of posts (in the extreme, only a few posts, such as three or four) that e.g. protrude outwardly beyond other portions of sidewalls 34.

In at least some embodiments, sidewalls 34 (and upper wall 35 if one is present and if it protrudes outward to the same distance as the outwardmost surfaces of sidewalls 34) may thus at least partially define an open-ended cavity 31 that, in use of assembly 1, faces toward wall 60. Base plate 30 comprises interior surface 32 within cavity 31. Interior surface 32 is not visible in typical use of the assembly and so it may or may not be decorative in appearance. Base plate 30 is configured such that open-ended cavity 31 (with the open end facing the wall) is capable of receiving mounting plate 10 and (in combination with the wall or surface to which mounting plate 10 is attached) may be capable of at least substantially concealing mounting plate 10 and double-faced adhesive sheet 20. That is, mounting plate 10 is configured so as to be able to fit partially, substantially or completely inside cavity 31. As disclosed herein, when the mounting plate 10 is in the first, undeflected condition, mounting plate 10 (and double-faced adhesive 20 thereon) is recessed within cavity 31. In this context, terms such as "in a recessed condition", "recessed relative to an imaginary plane", "recessed within a cavity", and the like, are specifically and affirmatively defined as meaning that all portions of mounting plate 10, including major surface 11; and, all portions of adhesive 20, including outwardmost (exposed) adhesive surface 22, are located inwardly (that is, toward interior surface 32 of cavity 31) relative to imaginary plane 55 defined by outwardmost surfaces 39 of base plate 30. In particular embodiments, an area of inward-facing surface 15 of mounting plate 10 (e.g., an area within lower portion 12 of mounting plate 10) may be configured to be pressed against (e.g., by a finger or a small tool) to achieve the desired asymmetric deflection. In specific embodiments, this area of inward-facing surface 15 may remain recessed within cavity 31 when mounting plate 10 is in the first, undeflected condition. In some embodiments, when mounting plate 10 is coupled to base plate 30 and is in the first, undeflected condition, at least this area of mounting plate 10 may be inwardly covered by base plate 30 so that this area is not visible when the assembly is viewed from a wall-facing vantage point.

The dimensions and geometric relationships of the various components of base plate 30, mounting plate 10 and double-faced adhesive 20 can be chosen to allow assembly 1 to function as disclosed herein. For example, the distance that exposed adhesive surface 22 is recessed relative to imaginary plane 55 should be sufficient to provide that the exposed adhesive surface does not accidentally contact the wall surface when the apparatus is in the first, undeflected condition. However, the distance of recess should not be so great that undue force is needed to deflect the first portion of the mounting plate sufficiently far to bring a first portion of the exposed adhesive surface into contact with the wall when desired. Thus in some embodiments, when mounting plate 10 is in the first, undeflected (recessed) condition, the entirety of exposed major adhesive surface 22 is located at a position that is, relative to imaginary plane 55, between 0.1, 0.2, or 0.4 mm inward toward interior surface 32 of the base plate and about 0.6, 1.0, 1.4, or 1.8 mm inward toward interior surface 32 of the base plate. In some embodiments, the entirety of exposed major adhesive surface 22 is located at a distance relative to imaginary plane 55, that is from 10%, to about 90%, of the thickness of double-faced adhesive (sheet) 20.

Thus in a one particular example, an adhesive sheet 20 of about 1.0 mm thickness may be used, and the assembly configured such that when mounting plate 10 and adhesive 20 are in the first, recessed condition, exposed adhesive surface 22 may be positioned about 0.5 mm inward of imaginary plane 55; and, the deflectable coupling between mounting plate 10 and base plate 30 may be such that a first portion of mounting plate 10 can easily be manually deflected a distance of e.g. about 1 mm outward, so that the exposed adhesive surface 22 of at least a section of the first portion 12 of mounting plate 10, can easily contact a wall surface when this is desired. Thus, in various embodiments, an exposed adhesive surface 22 of at least some area of first portion 12 of mounting plate 10, may move outward a distance of at least about 0.4, 0.8, 1.2, 1.6, or 2.0 mm, in being deflected from the first, undeflected condition to the second, deflected condition. In further embodiments, an exposed adhesive surface 22 of at least some area of first portion 12 of mounting plate 10, may move outward a distance of at most about 2.0, 1.6, or 1.2 mm, in being deflected from the first condition to the second condition. In particular embodiments, during the deflection process any point in such an area may move along an arcuate path that comprises an axis of rotation that passes at least generally through a coupling mechanism (e.g. of the general type described later herein) that couples the mounting plate and the base plate to each other.

Figure 10:
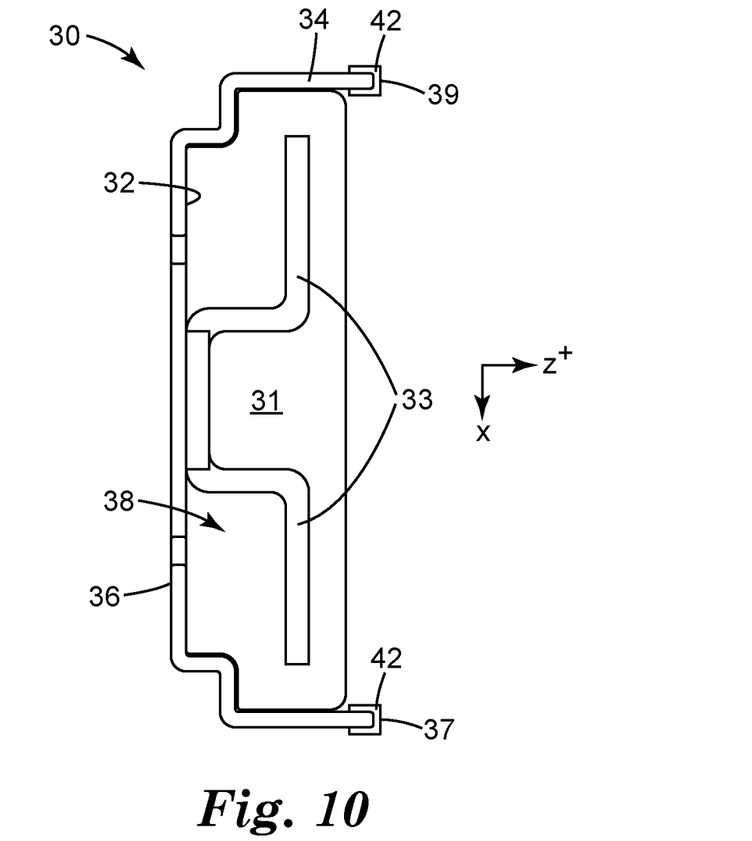
FIG. 10 is a bottom plan view of another exemplary base plate as disclosed herein.

In some embodiments, base plate 30 may comprise one or more removable spacers, which spacers may e.g. protrude outward from sidewalls 34, beyond an outwardmost surface of sidewalls 34. If such spacers are present, an outwardmost surface of the spacers will provide the outwardmost surfaces 39 of base plate 30 (that is, an outwardmost surface of the spacers will provide the wall-contacting surfaces when mounting plate is initially brought against a wall). As long as the spacer has a dimension (e.g., a thickness) in the inward-outward ($z^+$-$z^-$) direction that is sufficiently small to allow the exposed adhesive surface 22 to contact the wall when the asymmetric deflecting is performed, such a spacer will not disadvantageously affect the functioning of the assembly. In fact, such a spacer, if present when base plate 30 is initially brought against a wall, may e.g. act as an edge guard (e.g., edge guards 42 as shown in FIG. 10) to minimize the likelihood of an edge or corner of a sidewall accidentally scratching or otherwise marring the surface of the wall. Then, after the mounting plate is fully bonded to the wall and before the base plate is recoupled to the mounting plate, the edge guard may be removed and e.g. discarded or recycled. Such a spacer (e.g., edge guard) may be provided e.g. along some or all of the length of sidewalls 34 (and of upper wall 35 if present), in any suitable manner. For example, an edge guard might be a molded plastic channel (e.g., U-shaped in cross-section) that is fitted onto the outwardmost end of a sidewall 34. Or, it might take the form of a removable film e.g. with weak adhesive on a major surface thereof (or, e.g. a plastic wrap or "cling" film), which film is wrapped around the outwardmost end of a sidewall 34 along at least a portion of the sidewall.

It is emphasized that references herein to an outwardmost portion of a base plate (as discussed in the context of an imaginary plane, a recessed condition, an asymmetric deflection, and so on), refer to the outwardmost portion (surface) of a spacer (e.g., an edge guard) in embodiments in which such a spacer is present and provides such an outwardmost surface of the base plate (e.g. as with edge guards 42 as shown in FIG. 10). In various embodiments, the thickness of such a spacer (along the inward-outward direction, when base plate 30 is brought to a wall) may be at least about 10, 20, 50, 100, 200, 500, or 1000 microns. In further embodiments, the thickness of such a spacer may be at most about 2000, 1000, 800, 600, 400, or 200 microns. In particular embodiments, any such spacer (e.g., edge guard) may comprise a compressible material (e.g., a resilient organic polymeric foam or the like). In other embodiments, no spacer is provided on base plate 30.

The removable, deflectable coupling of mounting plate 10 to base plate 30 may be achieved in any suitable manner. Particular coupling mechanisms will be described in detail but it is emphasized that these are merely exemplary and that any suitable mechanism can be used. In general, a coupling mechanism may be achieved by providing base plate 30 with a coupling structure, and providing mounting plate 10 with a coupling structure that is complementary with the coupling structure of base plate 30, so that the two coupling structures can be mated together to form the coupling mechanism. It is emphasized that any such coupling mechanism must be decouplable; that is, it must be reversible so that mounting plate 10 and base plate 30 can be separated from each other when desired. In some embodiments, the coupling structures may be reversibly snap-fittable to each other to form the coupling mechanism.

Figure 7:
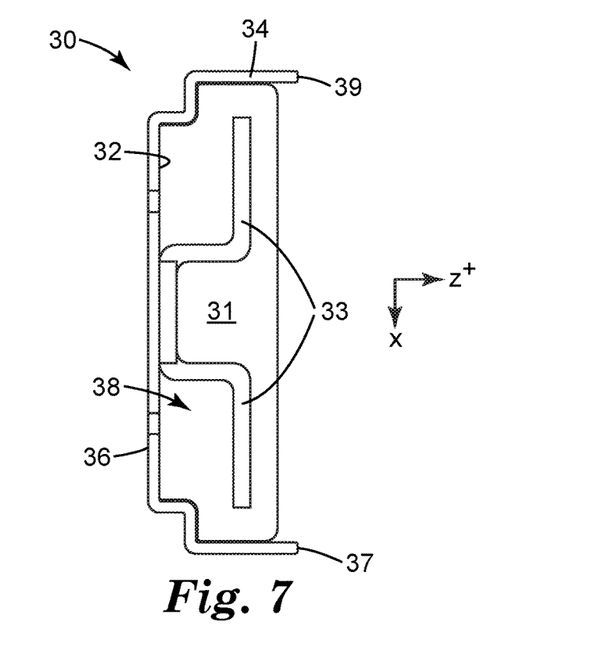
FIG. 7 is a bottom plan view of the exemplary base plate of FIG. 1.
Figure 8:
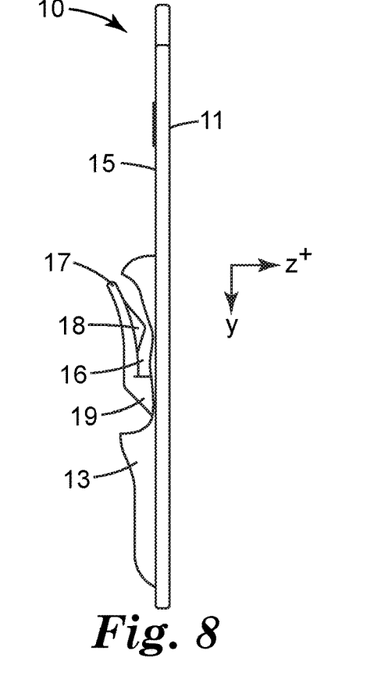
FIG. 8 is a side plan view of the exemplary mounting plate of FIG. 8, in partial cutaway.

In one exemplary mechanism, a coupling structure of base plate 30 may take the form of one or more engaging members 33 that are located within open-ended cavity 31 and that define a space 38 between engaging member 33 and interior surface 32 of base plate 30, as most easily seen in FIGS. 3 and 7. Mounting plate 10, in turn, may have a complementary coupling structure in the form of one or more mating members 17 that protrude from inward face 15 of mounting plate 10, as seen most easily in FIGS. 2 and 8. In the illustrated embodiment of FIGS. 2 and 8, mating members 17 each take the form of a cantilevered beam that flares inwardly in traversing its length from its attachment end to mounting plate 10 (i.e. from stanchion 19) to its distal (terminal) end. This inward flare can provide that as mounting plate 10 is coupled to base plate 30 e.g. by being slidably moved into cavity 31 (in a direction along the y axis of various Figures) beam 17 will slide into space 38 between engaging member 33 and interior surface 32 of base plate 30. Beam 17 may have an outward-projecting fin 18 (most easily seen in the cutaway view of FIG. 8) that helps define a space 16 (in between the outward surface of beam 17, the inward surface 15 of mounting plate 10, the lower edge of fin 18, and the upper surface of stanchion 19), into which engaging member 33 may be seated. In this manner, mounting plate 10 and base plate 30 may be snap-fitted together, with the interaction between engaging member(s) 33 and mating member(s) 17 being sufficient to prevent mounting plate 10 from being dislodged by gravity. However, beam 17 can be a deflectable beam, with the bending stiffness of cantilevered beam 17 chosen so that manually pushing mounting plate 10 downward (along the y axis) relative to base plate 30, can overcome the resistance to bending of the beam and thus momentarily force beam 17 away from surface 15 of mounting plate 10 to allow engaging member 33 of base plate 30 to disengage from mating member 17 when it is desired to decouple mounting plate 10 from base plate 30.

It will be appreciated that the coupling mechanism between mounting plate 10 and base plate 30 may advantageously be compliant (a deflectable beam being one exemplary design) so that when mounting plate 10 is attached to a wall and base plate 30 is recoupled to mounting plate 10, the compliance of the coupling mechanism may absorb a significant, or even substantial, portion of any force between the base plate and mounting plate that develops during and after the recoupling process. (This may advantageously lower or minimize any force that might otherwise be placed on the double-faced adhesive during and after the recoupling process.)

In some embodiments, the materials of a mating member (e.g., beam) 17 may be chosen along with the geometric parameters thereof, in order to provide the desired deflectability. For example, a mating member may be made of organic thermoplastic resin with a suitable modulus; in particular embodiments, a beam may be integrally formed (e.g., molded) with mounting plate 10. In some embodiments, an engaging member 33 of base plate 30 may be less deflectable (e.g., much stiffer, with a bending stiffness that is at least 5, 10, or 20 times higher) than beam 17 of mounting plate 10. In particular embodiments, an engaging member 33 may be made of metal, e.g. steel or aluminum, and may be e.g. attached to a base plate that is likewise made of metal. Of course, in some embodiments these roles may be reversed; e.g., a base plate and engaging member thereof may be made of molded plastic and a mounting plate and mating member thereof may be made of metal of much higher stiffness.

The above discussion applies to the assembly before and during the process of being mounted to a wall; once mounted to a wall, the weight of base plate 30, any accessory connected thereto, and any item supported by the accessory, may all be borne e.g. by way of the engaging member 33 being firmly seated atop, and supported by, stanchion 19 that also serves to connect mating member 17 to mounting plate 10.

Various other features (e.g., the dimensions of side flanges 13 of mounting plate 10, the positions of side flanges 13 of mounting plate 10 in relation to sidewalls 34 of base plate 30, the placement and length of engaging members 33 of base plate 30, and so on) may be chosen so as to dictate the tightness or looseness of the coupling between mounting plate 10 and base plate 30. In particular, these and other geometric relationships (in particular, the snugness in which engaging member 33 fits into space 16 between the outward surface of beam 17, the inward surface 15 of mounting plate 10, the lower edge of fin 18, and the upper surface of stanchion 19) may be chosen so as to define the amount of deflection that is allowed for the first portion of mounting plate 10. Such parameters may also govern whether (and how much) the second portion of mounting plate 10 deflects oppositely from the first portion, or remains substantially stationary, during the deflecting process.

The exemplary depictions herein all illustrate embodiments in which a mounting plate has two coupling structures (cantilevered beams, in this case) and a base plate has two complementary coupling structures. It is emphasized that while such arrangements may be desirable in some circumstances, in other embodiments a mounting plate may comprise a single coupling structure and a base plate may comprise a single complementary coupling structure. Of course, more than two such coupling structures may be provided on the base plate and mounting plate, if desired.

The discussions above have all concerned exemplary circumstances in which a single base plate and a single mounting plate are used. However, any number of either item may be used. In particular embodiments, two (or more) mounting plates and two (or more) corresponding base plates may be used, as in the exemplary design illustrated in FIG. 9. In fact, the designs disclosed herein may be particularly useful when it is desired to mount, upon a wall, an accessory that elongated to have a considerable horizontal length. Such accessories often use two or more base plates (that may be e.g. at least substantially parallel to each other), and it is often desired to bring the accessory against a wall and then to position it to ensure that it is sufficiently horizontal so as to not be visually unattractive. The disclosures herein allow an accessory that has two base plates and mounting plates to be horizontally aligned on a wall, and allows the mounting plates to then be partially bonded as described above. The base plates can then be decoupled from the mounting plates, the mounting plates fully bonded to the wall, and the base plates then recoupled to the mounting plates. The disclosures herein thus allow considerable flexibility particularly in the mounting of accessories that have considerable horizontal length and that thus may be difficult to position, orient and attach using conventional methods.

List of Exemplary Embodiments

Embodiment 1 is an assembly that is removably mountable to a wall, the assembly comprising: a base plate; and, a mounting plate that comprises a double-faced adhesive with a first major adhesive surface that is adhesively attached to a major surface of the mounting plate and with a second major adhesive surface that is an exposed adhesive surface; wherein the mounting plate is removably and deflectably coupled to the base plate so that the mounting plate is asymmetrically deflectable at least from a first, undeflected condition to a second, asymmetrically deflected condition, wherein when the mounting plate is in the first, undeflected condition all portions of the second major adhesive surface of the double-faced adhesive are positioned inward of outwardmost surface portions of the base plate, and wherein when the mounting plate is in the second, asymmetrically deflected condition, a first portion of the second major adhesive surface of the double-faced adhesive is positioned outward from the outwardmost surface portions of the base plate; and, a second portion of the second major adhesive surface of the double-faced adhesive remains positioned inward of the outwardmost surface portion of the base plate.

Embodiment 2 is the assembly of embodiment 1 wherein the outwardmost surface portions of the base plate define an imaginary plane; wherein when the mounting plate is in the first, undeflected condition, all portions of the mounting plate and the double-faced adhesive that is adhesively attached thereto, are recessed relative to the imaginary plane of the base plate, and, wherein when the mounting plate is in the second, asymmetrically deflected condition, a first portion of the second major adhesive surface of the double-faced adhesive protrudes outward past the imaginary plane of the base plate and a second portion of the second major adhesive surface of the double-faced adhesive remains recessed relative to the imaginary plane of the base plate.

Embodiment 3 is the assembly of embodiment 1 wherein the base plate comprises an open-ended cavity at least partially defined by sidewalls, which sidewalls comprise outwardmost surface portions that provide the outwardmost surface portions of the base plate and that establish at least a partial perimeter of the base plate, which partial perimeter defines an imaginary plane that defines an outwardmost limit of the open-ended cavity of the base plate; wherein when the mounting plate is in the first, undeflected condition, all portions of the mounting plate and the double-faced adhesive that is adhesively attached thereto, are recessed within the open-ended cavity of the base plate, and, wherein when the mounting plate is in the second, asymmetrically deflected condition, a first portion of the second major adhesive surface of the double-faced adhesive protrudes outward past the imaginary plane of the open-ended cavity of the base plate and a second portion of the second major adhesive surface of the double-faced adhesive remains recessed within the open-ended cavity of the base plate. Embodiment 4 is the assembly of embodiment 3 wherein the sidewall outwardmost surface portions that define the imaginary plane of the base plate, are provided by outwardmost surface portions of at least one edge guard that is removably attached to at least one sidewall.

Embodiment 5 is the assembly of any of embodiments 1-4 wherein the mounting plate is removably and deflectably attached to the base plate so that the when the mounting plate is asymmetrically deflected from the first, undeflected condition to the second, asymmetrically deflected condition, the second portion of the second major adhesive surface of the double-faced adhesive is moved inward away from an imaginary plane defined by outwardmost surface portions of the base plate.

Embodiment 6 is the assembly of any of embodiments 1-5 wherein when the mounting plate is in the first, undeflected condition, the entirety of the second major adhesive surface of the double-faced adhesive is located at a position that is, relative to an imaginary plane defined by outwardmost surface portions of the base plate, between 0.1 mm inward toward an interior surface of the base plate and about 1.0 mm inward toward the interior surface of the base plate. Embodiment 7 is the assembly of any of embodiments 1-6 wherein when the mounting plate is in the first, undeflected condition, the entirety of the second major adhesive surface of the double-faced adhesive is recessed relative to an imaginary plane defined by outwardmost surface portions of the base plate, a distance that is about 10% to about 90% of a thickness of the double-faced adhesive.

Embodiment 8 is the assembly of any of embodiments 1-7 wherein an area of an inward-facing major surface of the mounting plate is configured to be manually pressed outward so as to asymmetrically deflect the mounting plate from the first, undeflected condition to the second, deflected condition. Embodiment 9 is the assembly of any of embodiments 1-8 wherein the double-faced adhesive is a sheet of stretch-release adhesive comprising at least one pull tab, and wherein when the mounting plate is coupled to the base plate and the mounting plate is adhesively bonded to a wall, the base plate at least substantially conceals the mounting plate and the at least one pull tab.

Embodiment 10 is the assembly of any of embodiments 1-9 wherein the base plate comprises at least one connecting structure by which an accessory can be connected to the base plate. Embodiment 11 is the assembly of any of embodiments 1-10 wherein the mounting plate comprises at least one accessory that is fixedly connected thereto. Embodiment 12 is the assembly of embodiment 11 wherein the accessory is chosen from the group consisting of one or more shelves, baskets, hooks, racks, trays, elongate rods, and any combination thereof.

Embodiment 13 is the assembly of any of embodiments 1-12 wherein the base plate and mounting plate are a first base plate and a first mounting plate, the first base plate being fixedly attached to an accessory, and wherein the assembly further comprises a second base plate and a second mounting plate, the second mounting plate being removably and deflectably attached to the second base plate and the second base plate being fixedly connected to the accessory, and wherein the accessory is an elongate accessory with a long axis and is configured to be mounted on a wall with the long axis of the accessory oriented horizontally. Embodiment 14 is the assembly of any of embodiments 1-13 wherein the outwardmost surface portions of the base plate are provided by outwardmost surface portions of at least one spacer that is removably attached to the base plate.

Embodiment 15 is the assembly of any of embodiments 1-14 wherein the mounting plate is removably and deflectably coupled to the base plate by way of a coupling mechanism. Embodiment 16 is the assembly of embodiment 15 wherein the coupling mechanism is provided by at least one coupling structure of the mounting plate, and at least one complementary coupling structure of the base plate, which coupling structures are reversibly snap-fittable to each other to form the coupling mechanism. Embodiment 17 is the assembly of embodiment 16 wherein the coupling structure of the mounting plate comprises at least one deflectable beam that extends inwardly from an inward surface of the mounting plate. Embodiment 18 is the assembly of embodiment 17 wherein the at least one coupling structure of the base plate comprises at least one engaging member that extends outwardly from an interior surface of the base plate and that comprises a bending stiffness that is at least ten times a bending stiffness of the deflectable beam. Embodiment 19 is the assembly of embodiment 18 wherein the deflectable beam of the mounting plate is made of injection molded organic thermoplastic polymer and the deflectable beam is integral with the mounting plate; and wherein the engaging member of the base plate is made of metal.

Embodiment 20 is a method of mounting an assembly to a wall, the method comprising: providing an assembly comprising, a base plate and a mounting plate, the mounting plate bearing a double-faced adhesive with a first major surface that is adhesively attached to a major surface of the mounting plate and with a second major surface that is an exposed adhesive surface, and the mounting plate being removably and deflectably coupled to the base plate; positioning the base plate such that at least outwardmost surface portions of the base plate contact the wall; asymmetrically deflecting the mounting plate so that a first portion of the second, exposed major adhesive surface of the double-faced adhesive contacts the wall so as to partially bond the second, exposed major adhesive surface to the wall; decoupling the base plate from the mounting plate; pressing the mounting plate against the wall so that the second, exposed major adhesive surface of the double-faced adhesive is fully bonded to the wall; and, recoupling the base plate to the mounting plate. Embodiment 21 is the method of embodiment 20, performed using the assembly of any of embodiments 1-19.

Embodiment 22 is the method of embodiment 20 wherein the base plate and mounting plate are a first base plate and a first mounting plate, the first base plate being fixedly connected to an accessory, and wherein the assembly further comprises a second base plate and a second mounting plate, the second mounting plate being removably and deflectably coupled to the second base plate and the second base plate being fixedly connected to the accessory, and wherein the method further includes the steps of: positioning the second base plate such that at least outwardmost surface portions of the second base plate contact the wall; asymmetrically deflecting the second mounting plate so that a first portion of a second, exposed major adhesive surface of a double-faced adhesive of the second mounting plate contacts the wall so as to partially bond the second, exposed major adhesive surface of the double-faced adhesive of the second mounting plate to the wall; decoupling the second base plate from the second mounting plate; pressing the second mounting plate against the wall so that the second, exposed major adhesive surface of the double-faced adhesive of the second mounting plate is fully bonded to the wall; and, recoupling the second base plate to the second mounting plate.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. An assembly that is removably mountable to a wall, the assembly comprising:
    a base plate; and
    a mounting plate that comprises a double-faced adhesive with a first major adhesive surface that is adhesively attached to a major surface of the mounting plate and with a second major adhesive surface that is an exposed adhesive surface;
        wherein the mounting plate is removably and deflectably coupled to the base plate so that the mounting plate is asymmetrically deflectable at least from a first, undeflected condition to a second, asymmetrically deflected condition,
            wherein when the mounting plate is in the first, undeflected condition all portions of the second major adhesive surface of the double-faced adhesive are positioned inward of outwardmost surface portions of the base plate,
            wherein when the mounting plate is in the second, asymmetrically deflected condition, a first portion of the second major adhesive surface of the double-faced adhesive is positioned outward from the outwardmost surface portions of the base plate; and, a second portion of the second major adhesive surface of the double-faced adhesive remains positioned inward of the outwardmost surface portion of the base plate, and
        wherein the double-faced adhesive is a sheet of stretch-release adhesive comprising at least one pull tab, and wherein when the mounting plate is coupled to the base plate and the mounting plate is adhesively bonded to a wall, the base plate at least substantially conceals the mounting plate and the at least one pull tab.

2. The assembly of claim 1 wherein the outwardmost surface portions of the base plate define an imaginary plane;
    wherein when the mounting plate is in the first, undeflected condition, all portions of the mounting plate and the double-faced adhesive that is adhesively attached thereto, are recessed relative to the imaginary plane of the base plate,
    and, wherein when the mounting plate is in the second, asymmetrically deflected condition, a first portion of the second major adhesive surface of the double-faced adhesive protrudes outward past the imaginary plane of the base plate and a second portion of the second major adhesive surface of the double-faced adhesive remains recessed relative to the imaginary plane of the base plate.

3. The assembly of claim 1 wherein the base plate comprises an open-ended cavity at least partially defined by sidewalls, which sidewalls comprise outwardmost surface portions that provide the outwardmost surface portions of the base plate and that establish at least a partial perimeter of the base plate, which partial perimeter defines an imaginary plane that defines an outwardmost limit of the open-ended cavity of the base plate;
    wherein when the mounting plate is in the first, undeflected condition, all portions of the mounting plate and the double-faced adhesive that is adhesively attached thereto, are recessed within the open-ended cavity of the base plate,
    and, wherein when the mounting plate is in the second, asymmetrically deflected condition, a first portion of the second major adhesive surface of the double-faced adhesive protrudes outward past the imaginary plane of the open-ended cavity of the base plate and a second portion of the second major adhesive surface of the double-faced adhesive remains recessed within the open-ended cavity of the base plate.

4. The assembly of claim 3 wherein the sidewall outwardmost surface portions that define the imaginary plane of the base plate, are provided by outwardmost surface portions of at least one edge guard that is removably attached to at least one sidewall.

5. The assembly of claim 2 wherein the mounting plate is removably and deflectably attached to the base plate so that the when the mounting plate is asymmetrically deflected from the first, undeflected condition to the second, asymmetrically deflected condition, the second portion of the second major adhesive surface of the double-faced adhesive is moved inward away from the imaginary plane of the base plate.

6. The assembly of claim 2 wherein when the mounting plate is in the first, undeflected condition, the entirety of the second major adhesive surface of the double-faced adhesive is located at a position that is, relative to the imaginary plane of the base plate, between 0.1 mm inward toward an interior surface of the base plate and about 1.0 mm inward toward the interior surface of the base plate.

7. The assembly of claim 2 wherein when the mounting plate is in the first, undeflected condition, the entirety of the second major adhesive surface of the double-faced adhesive is recessed relative to the imaginary plane of the base plate, a distance that is about 10% to about 90% of a thickness of the double-faced adhesive.

8. The assembly of claim 1 wherein an area of an inward-facing major surface of the mounting plate is configured to be manually pressed outward so as to asymmetrically deflect the mounting plate from the first, undeflected condition to the second, deflected condition.

9. The assembly of claim 1 wherein the base plate comprises at least one connecting structure by which an accessory can be connected to the base plate.

10. The assembly of claim 1 wherein the mounting base plate comprises at least one accessory that is fixedly connected thereto.

11. The assembly of claim 10 wherein the accessory is chosen from the group consisting of one or more shelves, baskets, hooks, racks, trays, elongate rods, and any combination thereof.

12. The assembly of claim 1 wherein the mounting plate is removably and deflectably coupled to the base plate by way of a coupling mechanism.

13. The assembly of claim 12 wherein the coupling mechanism is provided by at least one coupling structure of the mounting plate, and at least one complementary coupling structure of the base plate, which coupling structures are reversibly snap-fittable to each other to form the coupling mechanism.

14. The assembly of claim 13 wherein the coupling structure of the mounting plate comprises at least one deflectable beam that extends inwardly from an inward surface of the mounting plate.

15. The assembly of claim 14 wherein the at least one coupling structure of the base plate comprises at least one engaging member that extends outwardly from an interior surface of the base plate and that comprises a bending stiffness that is at least ten times a bending stiffness of the deflectable beam.

16. The assembly of claim 15 wherein the deflectable beam of the mounting plate is made of injection molded organic thermoplastic polymer and the deflectable beam is integral with the mounting plate; and wherein the engaging member of the base plate is made of metal.

17. A method of mounting an assembly to a wall, the method comprising:
   providing an assembly comprising,
      a base plate and a mounting plate, the mounting plate bearing a double-faced adhesive with a first major surface that is adhesively attached to a major surface of the mounting plate and with a second major surface that is an exposed adhesive surface, and the mounting plate being removably and deflectably coupled to the base plate;
   positioning the base plate such that at least outwardmost surface portions of the base plate contact the wall;
   asymmetrically deflecting the mounting plate so that a first portion of the second, exposed major adhesive surface of the double-faced adhesive contacts the wall so as to partially bond the second, exposed major adhesive surface to the wall;
   decoupling the base plate from the mounting plate;
   pressing the mounting plate against the wall so that the second, exposed major adhesive surface of the double-faced adhesive is fully bonded to the wall;
   and,
   recoupling the base plate to the mounting plate.

18. The method of claim 17 wherein the base plate and mounting plate are a first base plate and a first mounting plate, the first base plate being fixedly connected to an accessory, and wherein the assembly further comprises a second base plate and a second mounting plate, the second mounting plate being removably and deflectably coupled to the second base plate and the second base plate being fixedly connected to the accessory, and wherein the method further includes the steps of:
   positioning the second base plate such that at least outwardmost surface portions of the second base plate contact the wall;
   asymmetrically deflecting the second mounting plate so that a first portion of a second, exposed major adhesive surface of a double-faced adhesive of the second mounting plate contacts the wall so as to partially bond the second, exposed major adhesive surface of the double-faced adhesive of the second mounting plate to the wall;
   decoupling the second base plate from the second mounting plate;
   pressing the second mounting plate against the wall so that the second, exposed major adhesive surface of the double-faced adhesive of the second mounting plate is fully bonded to the wall;
   and,
   recoupling the second base plate to the second mounting plate.

19. An assembly that is removably mountable to a wall, the assembly comprising:
   a base plate; and
   a mounting plate that comprises a double-faced adhesive with a first major adhesive surface that is adhesively attached to a major surface of the mounting plate and with a second major adhesive surface that is an exposed adhesive surface;
      wherein the mounting plate is removably and deflectably coupled to the base plate so that the mounting plate is asymmetrically deflectable at least from a first, undeflected condition to a second, asymmetrically deflected condition,
         wherein when the mounting plate is in the first, undeflected condition all portions of the second major adhesive surface of the double-faced adhesive are positioned inward of outwardmost surface portions of the base plate,
      wherein when the mounting plate is in the second, asymmetrically deflected condition, a first portion of the second major adhesive surface of the double-faced adhesive is positioned outward from the outwardmost surface portions of the base plate; and, a second portion of the second major adhesive surface of the double-faced adhesive remains positioned inward of the outwardmost surface portion of the base plate, and
      wherein the base plate and mounting plate are a first base plate and a first mounting plate, the first base plate being fixedly attached to an accessory, and wherein the assembly further comprises a second base plate and a second mounting plate, the second mounting plate being removably and deflectably attached to the second base plate and the second base plate being fixedly connected to the accessory, and wherein the accessory is an elongate accessory with a long axis and is configured to be mounted on a wall with the long axis of the accessory oriented horizontally.

* * * * *

UNITED STATES PATENT AND TRADEMARK OFFICE
CERTIFICATE OF CORRECTION

PATENT NO. : 9,970,475 B2
APPLICATION NO. : 15/526074
DATED : May 15, 2018
INVENTOR(S) : Vicky Chang Page 1 of 1

It is certified that error appears in the above-identified patent and that said Letters Patent is hereby corrected as shown below:

On the Title Page

Column 1 (Notice)
Line 3, Delete "0 days. days." and insert -- 0 days. --, therefor.

In the Specification

Column 6
Line 63, Delete "e g" and insert -- e.g. --, therefor.

In the Claims

Column 17
Line 7, In Claim 10, before "base" delete "mounting".

Signed and Sealed this
Nineteenth Day of March, 2019

Andrei Iancu
*Director of the United States Patent and Trademark Office*